US009839196B2

(12) United States Patent
Taffler et al.

(10) Patent No.: US 9,839,196 B2
(45) Date of Patent: Dec. 12, 2017

(54) METHOD FOR TAGGING AND TRACKING WILDLIFE

(71) Applicant: Bay Slayers, LLC, Sneads Ferry, NC (US)

(72) Inventors: Michael A Taffler, Sneads Ferry, NC (US); Richard Scialabba, Sneads Ferry, NC (US)

(73) Assignee: Bay Slayers, LLC, Sneads Ferry, NC (US)

(*) Notice: Subject to any disclaimer, the term of this patent is extended or adjusted under 35 U.S.C. 154(b) by 0 days.

(21) Appl. No.: 14/960,137

(22) Filed: Dec. 4, 2015

(65) Prior Publication Data
US 2016/0157462 A1 Jun. 9, 2016

Related U.S. Application Data

(60) Provisional application No. 62/088,089, filed on Dec. 5, 2014.

(51) Int. Cl.
| | |
|---|---|
| *G08B 23/00* | (2006.01) |
| *A01K 11/00* | (2006.01) |
| *G06F 17/30* | (2006.01) |
| *G06F 21/62* | (2013.01) |
| *A01K 29/00* | (2006.01) |
| *G06Q 50/02* | (2012.01) |

(52) U.S. Cl.
CPC .......... *A01K 11/008* (2013.01); *A01K 29/005* (2013.01); *G06F 17/30241* (2013.01); *G06F 17/30377* (2013.01); *G06F 21/6218* (2013.01); *G06Q 50/02* (2013.01)

(58) Field of Classification Search
CPC .. A01K 11/006; A01K 11/008; A01K 29/005; G06F 17/30241; G06F 17/30377; G06F 21/6218; G06Q 50/02
USPC ...... 340/573.2, 573.3, 539.13; 119/712, 720, 119/721; 43/17
See application file for complete search history.

(56) References Cited

U.S. PATENT DOCUMENTS

| | | | | | |
|---|---|---|---|---|---|
| 5,923,254 | A | * | 7/1999 | Brune | .................. A01K 15/021 340/573.1 |
| 6,163,503 | A | * | 12/2000 | Gudbjornsson | ......... G01S 19/42 367/6 |
| 6,720,879 | B2 | * | 4/2004 | Edwards | .............. A01K 15/021 340/539.13 |
| 7,300,367 | B1 | * | 11/2007 | Andol | .................. F42B 12/385 342/385 |

(Continued)

*Primary Examiner* — Thomas Mullen
(74) *Attorney, Agent, or Firm* — NK Patent Law, PLLC

(57) ABSTRACT

A method for tagging and tracking animals utilizes a plurality of user accounts and a plurality of species profiles. A user account of the plurality of user accounts is utilized to enter tag information from a tag of a plurality of tracking tags. More specifically, the tag is attached to a specific animal. When the tag information is entered, a relevant profile from the plurality of species profiles is selected. The relevant profile has information related to the specific animal. Next, the user completes a plurality of fields related to the specific animal which is saved into the relevant profile. Simultaneously, a list of geographical information is completed and saved into the relevant profile. As a result, the relevant profile is saved with the latest information of the specific animal. When required, a premium account of the plurality of user accounts is used to view the relevant profile.

2 Claims, 9 Drawing Sheets

(56) References Cited

U.S. PATENT DOCUMENTS

| | | | | |
|---|---|---|---|---|
| 2007/0210927 A1* | 9/2007 | Domeier | ............... | G01C 21/08 340/573.2 |
| 2008/0186166 A1* | 8/2008 | Zhou | .................... | G01S 5/0027 340/539.13 |
| 2012/0124387 A1* | 5/2012 | Skocic | ................. | G06F 19/322 713/186 |
| 2014/0352632 A1* | 12/2014 | McLaughlin | ........ | A01K 11/008 119/721 |

\* cited by examiner

METHOD FOR TAGGING AND TRACKING WILDLIFE

The current application claims a priority to the U.S. Provisional Patent application Ser. No. 62/088,089 filed on Dec. 5, 2014.

FIELD OF THE INVENTION

The present invention relates generally to a method of tagging and tracking wildlife. More specifically, the present invention introduces a method which can be used by wildlife enthusiasts for recreational purposes and also by researchers for research purposes.

BACKGROUND OF THE INVENTION

Tracking animals in the natural habitat is beneficial for multiple reasons. Important information such as the travel patterns of the animal, the threats faced by the animal, and other comparable data can be recorded by tracking the animal. Based on the information recorded, researchers can ensure that the tracked animal remains safe in the wildlife. The ability to track the animal is especially beneficial in today's society, where animals are lured out of restricted areas for hunting purposes. Therefore, animal tracking can also be used to protect animals from being hunted.

In addition to the research benefits, other individuals such as fisherman can also benefit from tracking fish within an area. As an example, tracking the travel patterns of fish can be used to identify the most populated areas of a certain type of fish. Using the data obtained, the most populated areas can be used during fishing in order to obtain maximum results. Likewise, researchers can also obtain data which can be beneficial in future experiments.

Even though the existing tagging and tracking systems serve the intended purpose, they do have some significant disadvantages. For instance, most of the existing tagging and tracking systems require a considerable financial investment and are mostly used by researchers with a solid financial backing. Therefore, the benefits to a regular wildlife enthusiast are fairly limited. Since most of the tagging and tracking systems are conducted by researchers, the information made available to the individual user is limited. As a result, the individual user is unable to store animal data for future reference.

When utilizing a majority of the tagging and tracking systems, the user needs to go through an extended procedure prior to obtaining the required information. As an example, if the user needs to get information on a single animal, a lengthy procedure takes place prior to providing information to the user. The lengthy procedure oftentimes hinders the purpose of the individual which is to instantly receive information related to the animal.

The objective of the present invention is to address the aforementioned issues. In particular, the method introduced by the present invention allows the user to tag an animal and also keep track of the animal. Preferably, the present invention is to be used for tagging and tracking fish. Therefore, by utilizing the present invention both the recreational needs and the research needs related to fish can be fulfilled.

DETAILED DESCRIPTIONS OF THE INVENTION

All illustrations of the drawings are for the purpose of describing selected versions of the present invention and are not intended to limit the scope of the present invention.

The present invention introduces a method for tagging and tracking animals. More specifically, by utilizing the present invention the user is able to get information related to an animal of the wildlife instantly. As a result, the present invention eliminates the waiting period existent with most traditional tagging and tracking systems. The efficiency of the present invention can be beneficial to both researchers and other individuals such as fisherman and wildlife enthusiasts.

Figure 1:
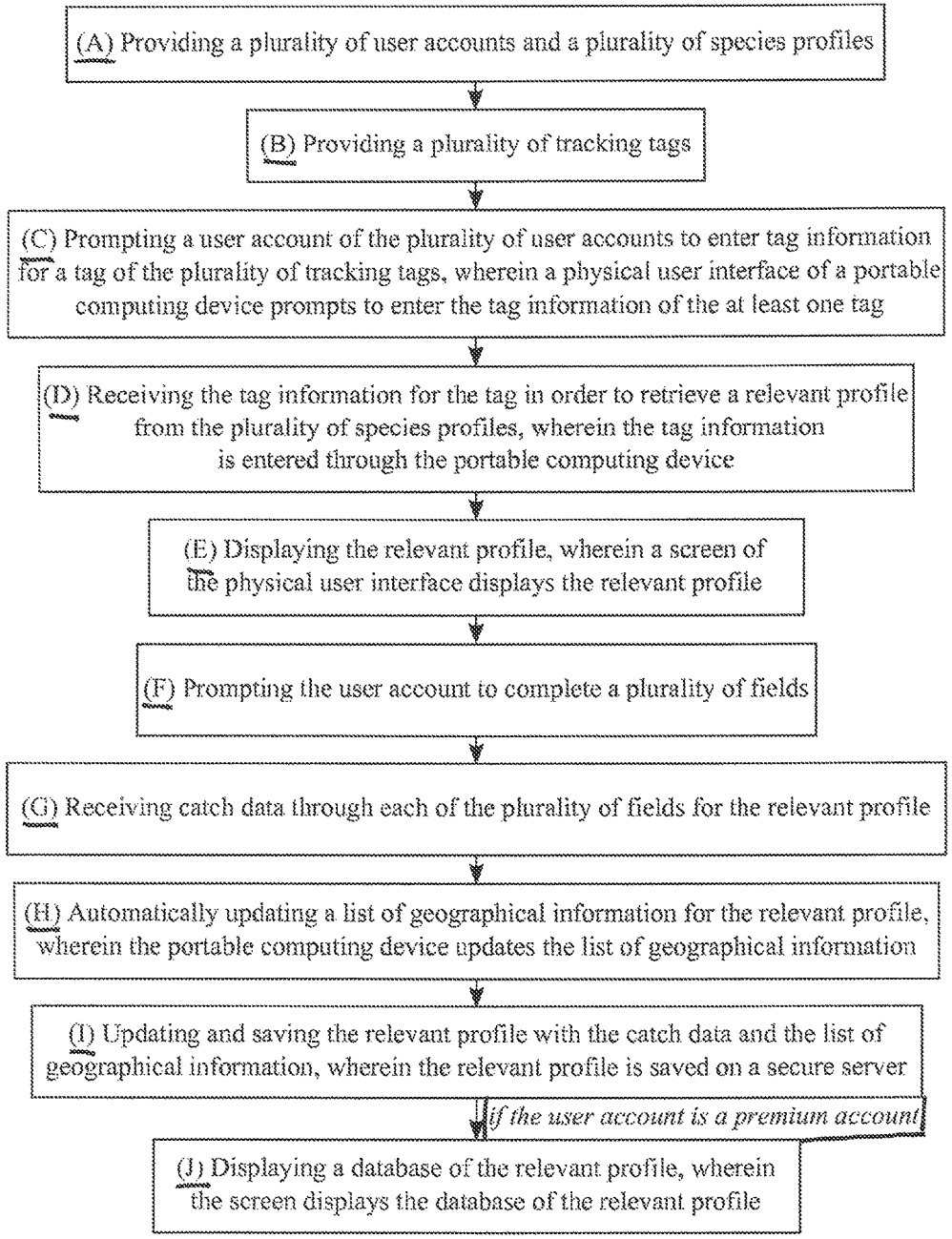
FIG. 1 is a flowchart illustrating the basic overall process of the present invention.

As illustrated in FIG. 1, in the process of tagging and tracking a specific animal, the present invention uses a plurality of user accounts and a plurality of species profiles. The plurality of user accounts is utilized by the researchers, the fishermen, or any other user utilizing the present invention. The plurality of species profiles is used to track and maintain a record of the animals. In the preferred embodiment, when the present invention is used for tagging and tracking fish, each of the plurality of species profiles gives information regarding a fish. In order to complete the tracking process of the present invention, a plurality of tracking tags is provided. The plurality of tracking tags is attached to the animals who are intended to be tracked and can vary in size, shape, and material. In the preferred embodiment of the present invention, the plurality of tracking tags is attached to fish. However, in another embodiment of the present invention, the plurality of tracking tags can be attached to birds or any other animal. As an initial step, the present invention prompts a user account of the plurality of user accounts to enter tag information for a tag of the plurality of tracking tags. A physical user interface of a portable computing device prompts the user account to enter the tag information. The portable computing device can be, but is not limited to, a mobile phone or other comparable device. The tag information includes details that can be used to determine the specific animal and any other data related to the specific animal. When the tag information is received from the tag, the present invention retrieves a relevant profile from the plurality of species profiles. In other words, the present invention matches the specific animal with the relevant profile by using the tag information. The user account enters the tag information through the portable computing device. When the relevant profile is identified, the present invention displays the relevant profile through a screen of the physical user interface. As an example, if a mobile phone is being used, the relevant profile is displayed on the screen of the mobile phone. Upon displaying the relevant profile, the present invention prompts the user account to complete a plurality of fields. When the user account completes the plurality of fields, the present invention receives catch data through each of the plurality of fields for the relevant profile. The plurality of fields is directly related to the specific animal and is useful in understanding the changes of the specific animal since the last time the tag of the specific animal was read. In addition to the plurality of fields, the relevant profile also contains a section for geographical information. The geographical information is especially beneficial for research purposes. In order to complete the relevant geographical information the present invention automatically updates a list of geographical information through the portable computing device. In the preferred embodiment of the present invention, the list of geographical information can include, but is not limited to fields such as moon phase, location, current, wind speed, and wind direction. In addition to the list of geographical information, the date and time of catching the specific animal is also obtained through the portable computing device. The list of geographical information and other related data is completed by utilizing the global positioning system (GPS) of the portable computing device. Upon receiving the list of geographical information and the catch data, the relevant profile is updated and saved on a secure server accordingly. Therefore, the relevant profile can be used for research data or informational purposes whenever the need arises. However, in order to improve data efficiency and fulfill other security purposes, the present invention limits accessibility to a database of the relevant profile. More specifically, the present invention displays the database of the relevant profile only if the user account is a premium account. In order to obtain the premium account, the user makes a payment when establishing the user account. When the premium account is obtained, the user can view the database of the relevant profile through the screen of the physical user interface.

Figure 2:
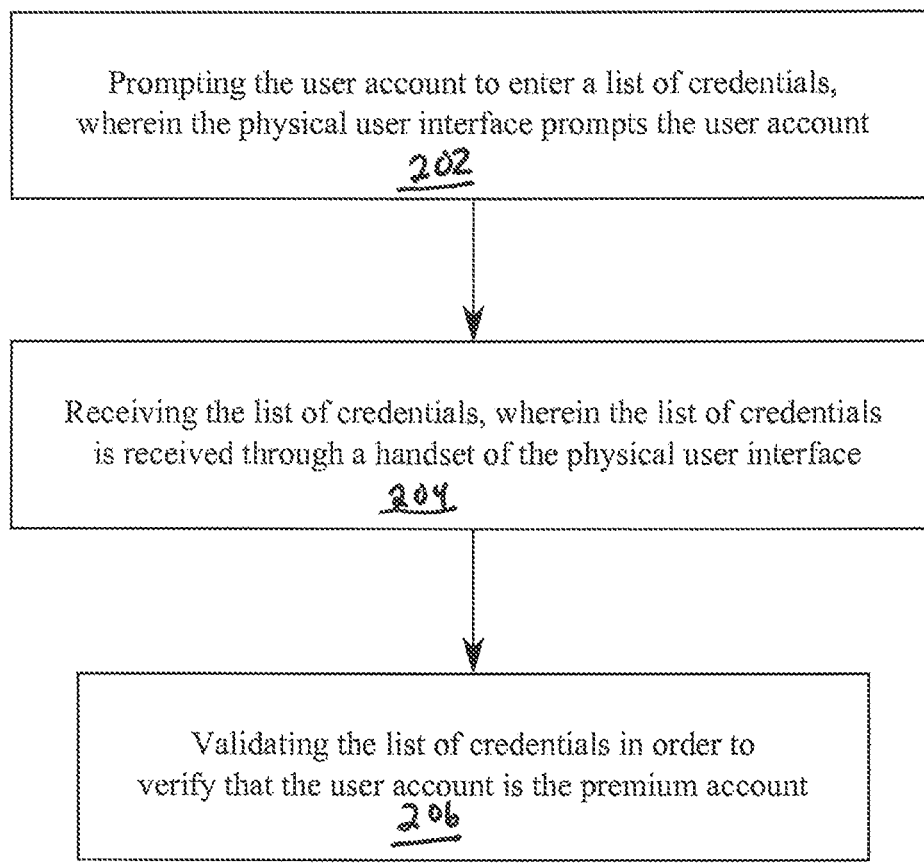
FIG. 2 is a flowchart illustrating the process of validating a premium account.
Figure 9:
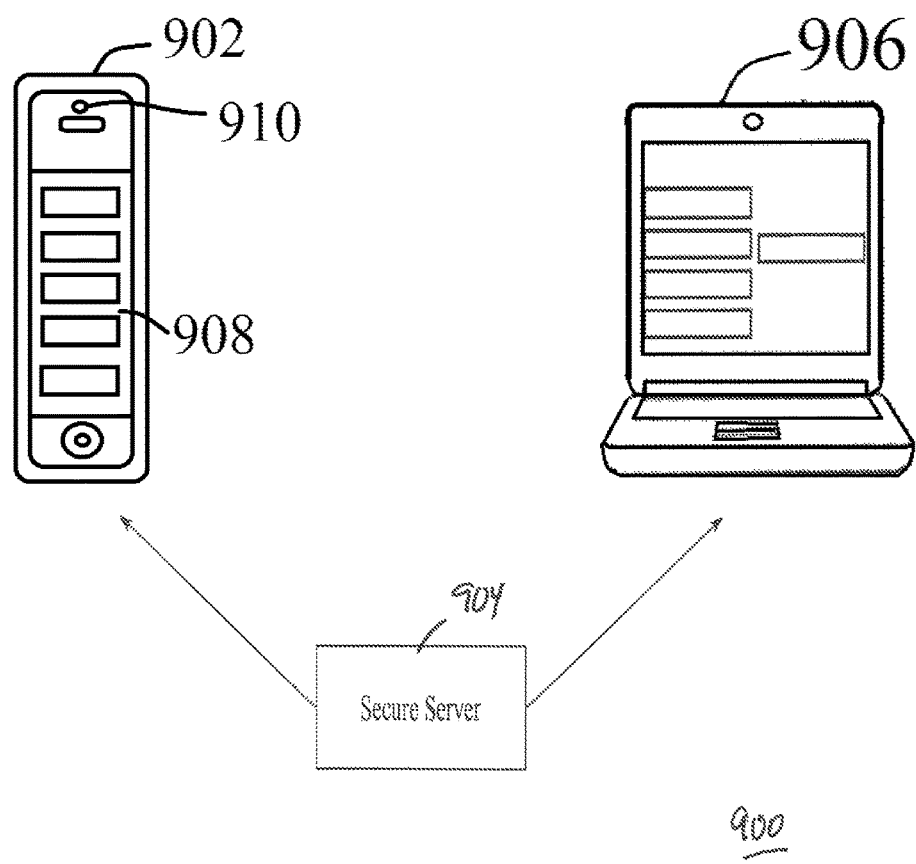
FIG. 9 is an illustration of the connection of the secure server and the portable computing device.

As seen in FIG. 2, the premium account is verified by the present invention through a list of credentials. The list of credentials can be, but is not limited to, a username and a password. In order to grant access for the premium account, the present invention initially prompts the user account to enter the list of credentials. When the user enters the list of credentials, the present invention receives the list of credentials through a handset of the physical user interface. Upon receiving the list of credentials, the present invention validates the list of credentials in order to verify the user account as the premium account. As illustrated in FIG. 9, the premium account is granted to view data through the secure server of the present invention, where a system 900 includes the computing device 902, secure server 904, and computing device 906. Computing device 902 includes a user interface 908 and imaging device 910. The method 200 of FIG. 2 may include prompting the user account to enter a list of credentials, wherein the physical user interface prompts the user account 202, receiving the list of credentials, wherein the list of credentials is received through a handset of the physical user interface 204, and validating the list of credentials in order to verify that the user account is the premium account 206.

Figure 5:
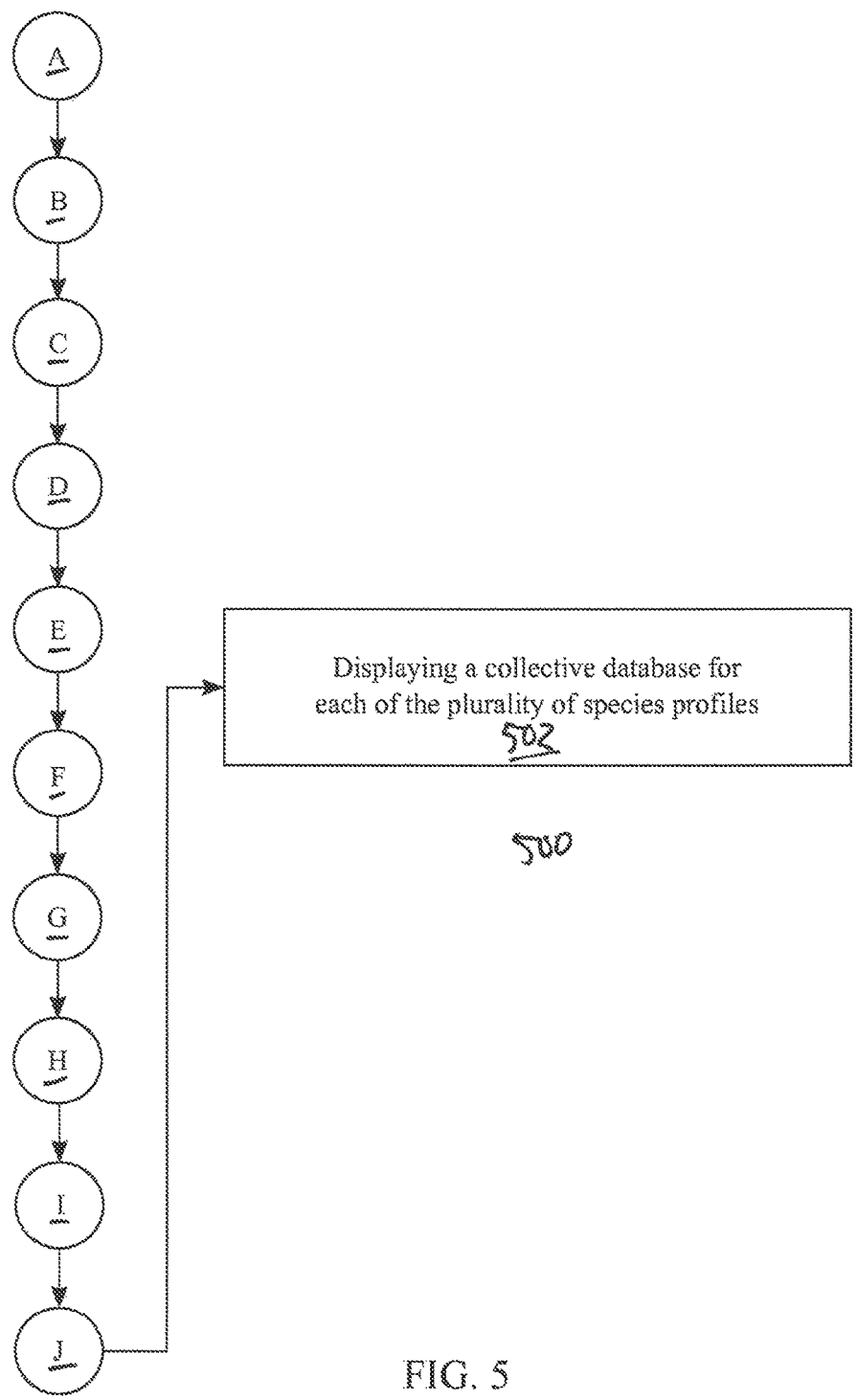
FIG. 5 is a flowchart illustrating the process of displaying the collective database.

As discussed earlier, the premium account has access to the database of the relevant profile. Through the database the premium account also has the ability to view a collective database of each of the plurality of species profiles as illustrated in FIG. 5. The collective database is an information platform for each of the plurality of species profiles. As an example, the collective database can contain a history of at least one species from the plurality of species. In the preferred embodiment of the present invention, when the present invention is being used to tag and track fish, the collective database contains a history of each of the fish represented by the plurality of species profiles. As an example, the previous instances in which the fish was captured and all other related data is stored as part of the history. Similar to displaying the database of the relevant profile, the collective database for each of the plurality of species profiles is also displayed through the screen. FIG. 5 illustrates a method 500 that includes displaying a collective database for each of the plurality of species profiles 502.

Figure 6:
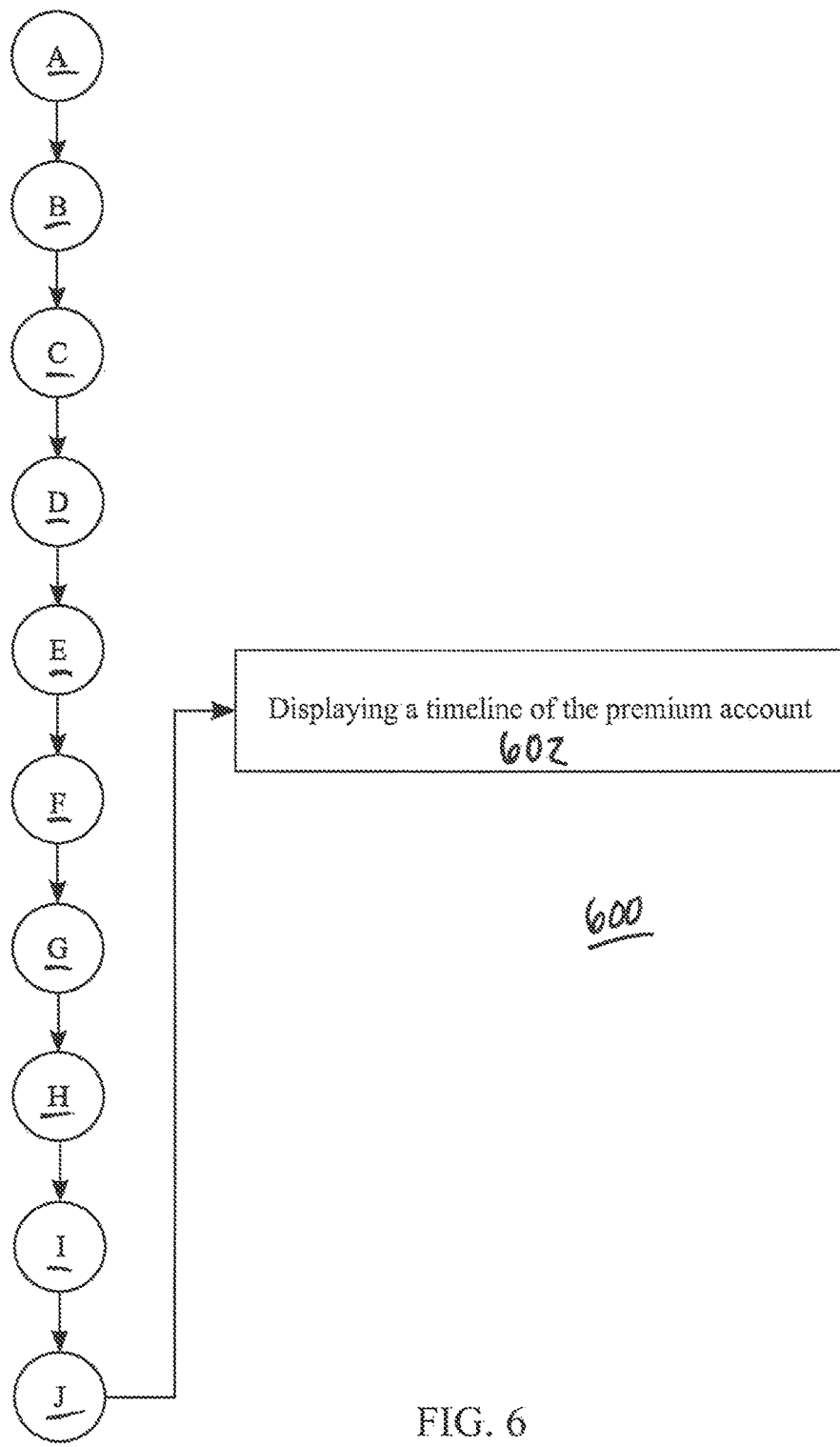
FIG. 6 is a flowchart illustrating the process of displaying a timeline for the premium account.

In addition to viewing the collective database, the premium account holders also have the ability to maintain a profile through the present invention. As illustrated in FIG. 6, the present invention displays a timeline of the premium account through the screen. The timeline is a record of the premium account. Therefore, the premium account holder can get a better understanding of the previous catches and overall activity of the premium account for a recorded time period. When considering the preferred embodiment of the present invention, the timeline can be used as a log for fishing. FIG. 6 illustrates a method 600 that includes displaying a timeline of the premium account 602.

Figure 3:
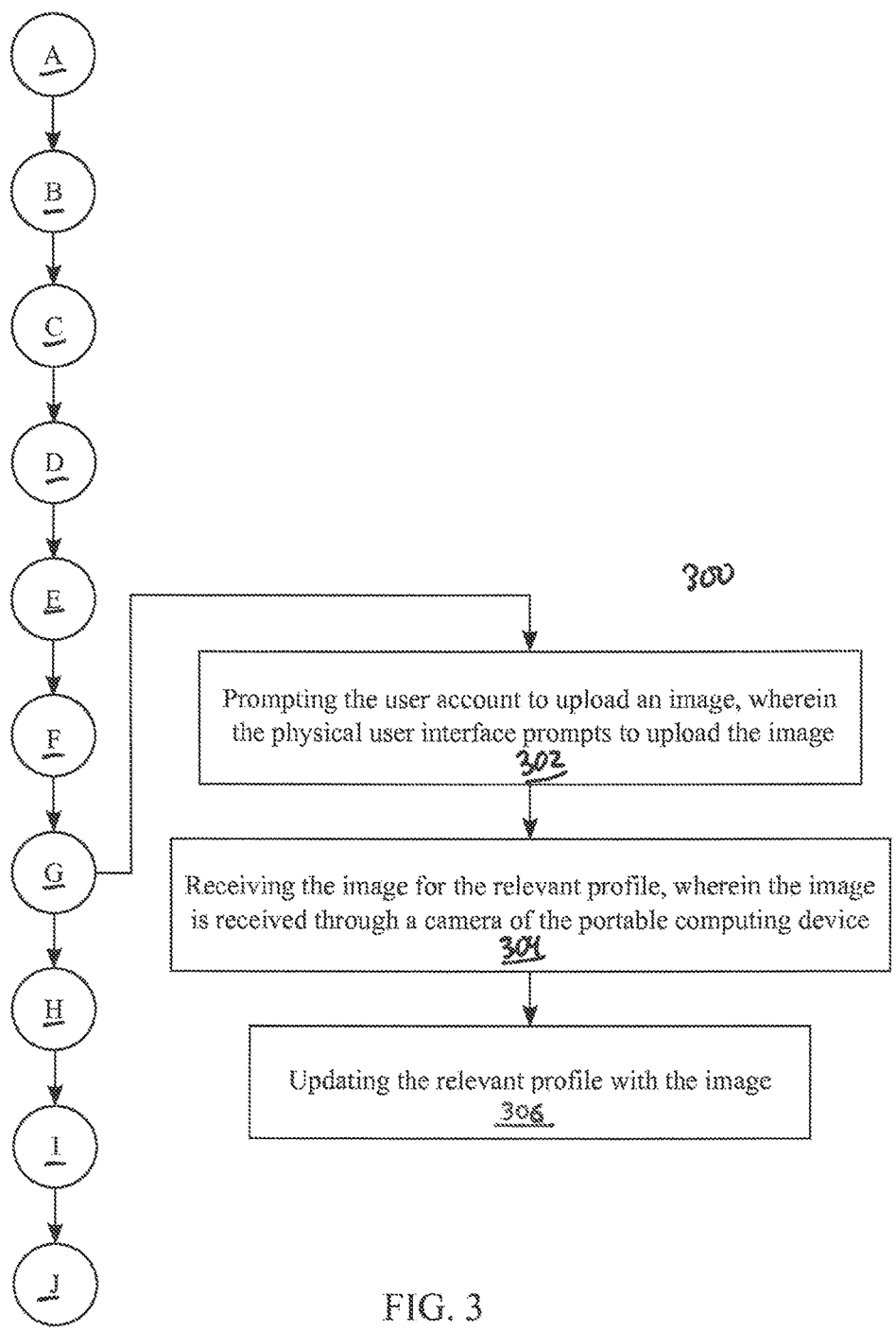
FIG. 3 is a flowchart illustrating the process of uploading an image as catch data for the plurality of fields.

As illustrated in FIG. 3, in order to ensure accurate information is uploaded, the present invention prompts the user to upload an image of the specific animal at the time of the catch. The image is helpful for a viewer to understand the true nature of the catch. The method 300 may include prompting the user account to upload an image, wherein the physical user interface prompts to upload the image 302, receiving the image for the relevant profile, wherein the image is received through a camera of the portable computing device, and updating the relevant profile with the image 304. The method may include updating the relevant profile with the image 306.

In the preferred embodiment of the present invention, the image is useful to give an idea of the size of the fish. Additionally, the present invention prompts the user to upload an image with the catch. The present invention receives the image for the relevant profile through a camera of the portable computing device. When received, the present invention proceeds to update the relevant profile with the image. Therefore, the person accessing the relevant profile through the premium account can view the image and visualize the size of the catch in comparison to the user account who uploaded the image.

Figure 4:
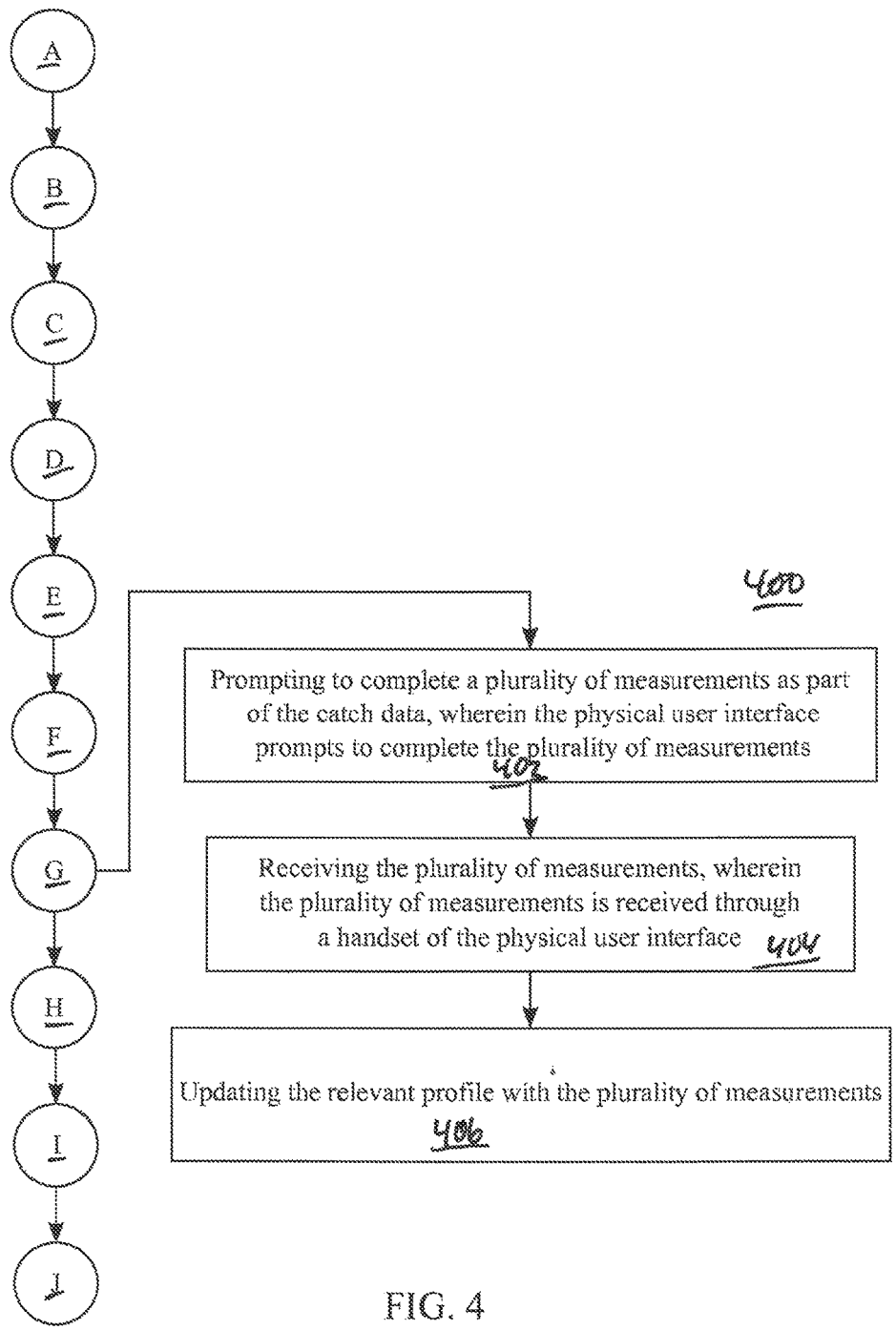
FIG. 4 is a flowchart illustrating the process of uploading a plurality of measurements as catch data for the plurality of fields.

As previously discussed, the present invention receives catch data from the user account. In the preferred embodiment of the present invention, the catch data can include fields such as length, girth, estimated weight, bait, and the level of resistance of the fish prior to being captured. During the process of completing the plurality of fields, the present invention prompts the user account to complete a plurality of measurements as part of the catch data. As shown in FIG. 4, the physical user interface prompts the user account to complete the plurality of measurements. When the user account provides the plurality of measurements, the present invention receives the plurality of measurements through a handset of the physical user interface. According to the plurality of measurements, the present invention updates the relevant profile. The method 400 illustrated in FIG. 4 may include prompting to complete a plurality of measurements as part of the catch data, wherein the physical user interface prompts to complete the plurality of measurements 402, receiving the plurality of measurements, wherein the plurality of measurements is received through a handset of the physical user interface 404, and updating the relevant profile with the plurality of measurements 406.

Figure 7:
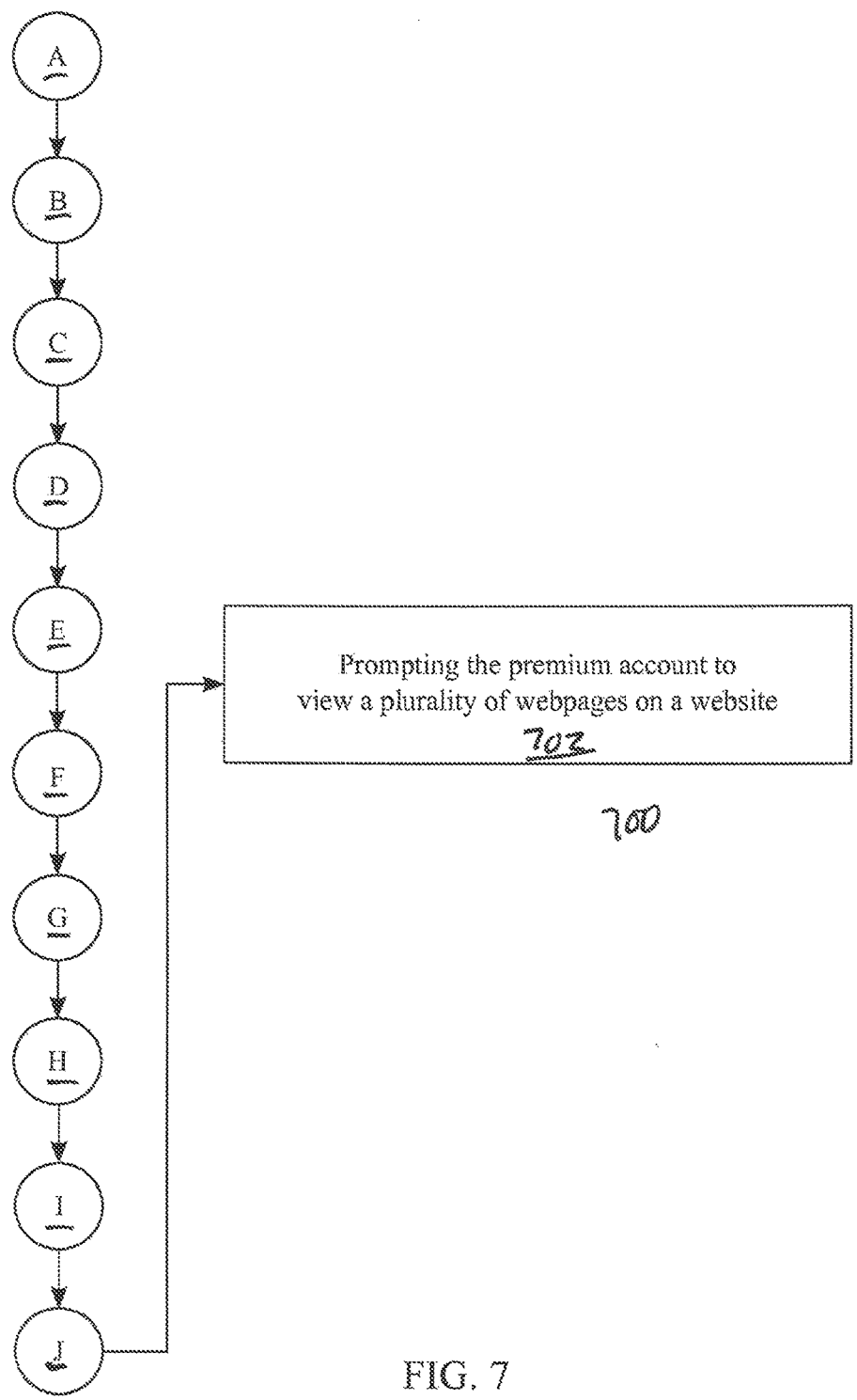
FIG. 7 is a flowchart illustrating the process of displaying a plurality of webpages.

The present invention also allows the person using the premium account to access a plurality of webpages on a website as illustrated in FIG. 7. In doing so, the present invention initially prompts the premium account to view the plurality of webpages. Upon user approval, the present invention then directs the premium account to the plurality of webpages on the website. The plurality of webpages contains information that is beneficial in the process of tagging and tracking the specific animal. FIG. 7 illustrates a method 700 that includes prompting the premium account to view a plurality of webpages on a website 702.

As an example, one of the plurality of webpages is an encyclopedia of the plurality of species profiles. When considering the preferred embodiment of the present invention, the encyclopedia contains information regarding fish. The encyclopedia allows the premium account to be more knowledgeable regarding the plurality of species.

The present invention also provides a social media platform as one of the plurality of webpages. The social media platform allows users of a plurality of premium accounts to interact with each other through the present invention. The social media platform can further be used to exchange information regarding tagging and tracking the specific animal. For instance, in the preferred embodiment of the present invention, a first premium account user can provide information to a second premium account user regarding the method and tactics involved in catching a certain type of fish. The premium account can also utilize the social media platform to create and expand upon a friend network with similar interests.

Figure 8:
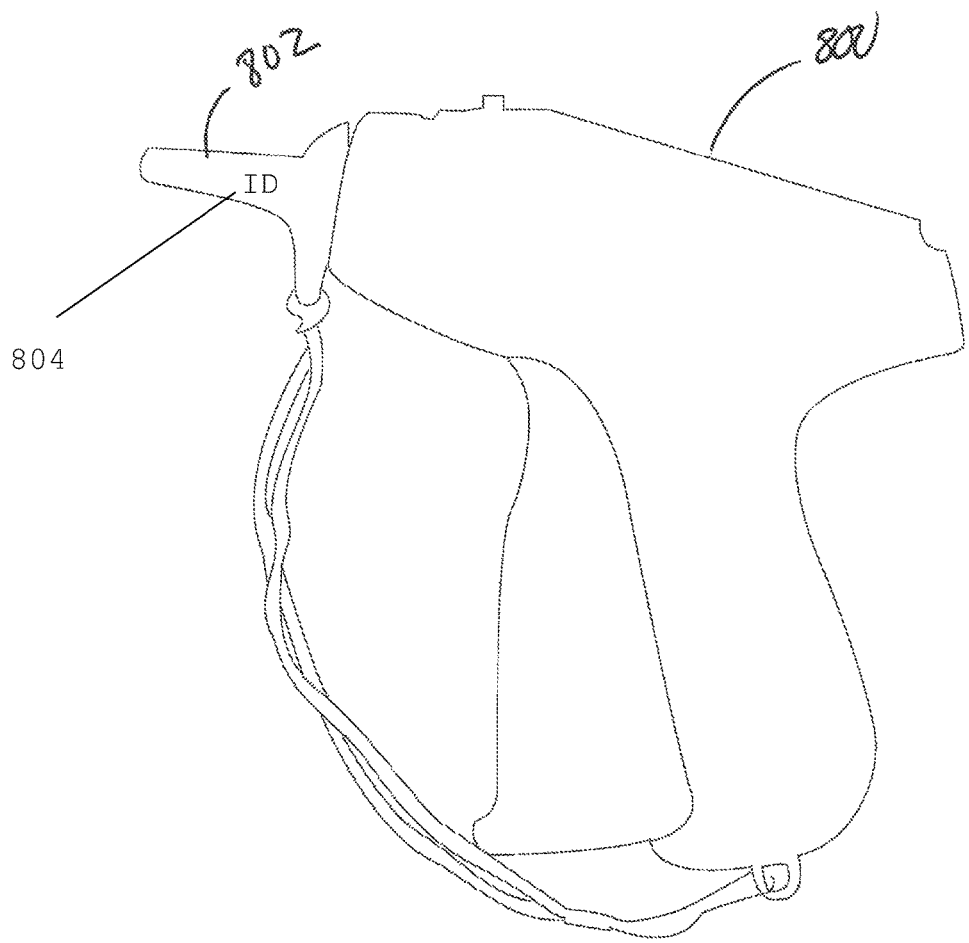
FIG. 8 is an illustration of the tagging gun used in the tagging process of the present invention.

As previously discussed, the user enters tag information of the specific animal who contains a tag. However, the user is unable to enter tag information if the specific animal does not contain the tag. The present invention provides a webpage from the plurality of webpages with a list of tagging information for the plurality of specific profiles. Therefore, if the premium account holder encounters an animal without the tag, the list of tagging information can be used to tag the animal. The list of tagging information can include, but is not limited to, video instructions on how different types of animals need to be tagged. As an example, the video instructions can show the user the method of controlling a tagging gun during the process of tagging the specific animal. FIG. 8 represents a tagging gun 800 with tags 802, containing information 804, that can be used along with the present invention.

As experienced by many wildlife enthusiasts, the rules and regulations related to wildlife differ from one area to another. When considering fishing, the size of the fish that can be consumed and the size of the fish that needs to be released differs from one state to another. In order to educate the user regarding these differences, one of the plurality of webpages is dedicated to providing legal information regarding the plurality of species profiles. More specifically, fish regulations for different states and areas is included as legal information.

The present invention also provides a webpage containing a plurality of recipes. The plurality of recipes is especially important in the preferred embodiment of the present invention, when the present invention is used along with fishing. When the user catches a fish of legally acceptable size and decides to consume the fish, the plurality of recipes can be useful to be informed regarding different cooking methods.

When considering the equipment used by wildlife enthusiasts and researchers for tagging and tracking purposes, a list of common items can be identified. In order to provide user convenience, the present invention offers a retailer webpage which can be used for selling and buying equipment that is used during tagging and tracking wildlife. Since all buying and selling is done through the present invention, the hassle of finding buyers or sellers with similar interests is eliminated. As an example, if the user intends on selling a fishing rod, the present invention can be used to find a buyer with similar interests.

In another embodiment of the present invention, a gaming feature can be included for the plurality of user accounts. The gaming feature, which can vary in different embodiments of the present invention, utilizes the plurality of user accounts and the tag information uploaded by each of the plurality of user accounts. As an example, when the user account enters the tag information for the specific animal, the present invention transfers the tag information to a gaming platform which can be viewed by other users participating in the gaming feature. Utilizing the tag information made available through the gaming feature, other users attempt to track the specific animal. In other embodiments of the present invention, rewards can be included for winners of the gaming feature.

When utilizing the method of the present invention, the following process flow can be followed. As a first step, when the specific animal is caught, the person accessing the user account enters the tag information from the tag on the specific animal. The tag information can be entered by scanning the tag with the camera. In order to do so, the tag contains a barcode or similar scannable portion which can be conveniently accessed by the user account. However, if the tag cannot be scanned, the tag information can also be entered manually through the physical user interface. When the tag information is received, the present invention displays the relevant profile through the screen and prompts the user account to complete the plurality of fields with catch data such as length, girth, and weight. In other words, the user account provides the plurality of measurements related to the specific animal. Additionally, the user account also uploads the image of the specific animal. Simultaneously, the present invention updates a list of geographical information along with the date and time by using the GPS of the portable computing device. When the relevant profile is complete with the plurality of fields, the list of geographical information, and the date and time, the present invention updates and saves the relevant profile on the secure server. Next, the relevant profile is made available for the person accessing the present invention with the premium account. In other words, only the paid members are granted access to the relevant profile at a later time. When the present invention is accessed with the premium account, the database of the relevant profile can be viewed. More specifically the collective database of the plurality of species profiles and the timeline of the premium account can be viewed by the person accessing the present invention through the premium account. As an additional benefit, the person accessing the present invention through the premium account can access the plurality of webpages. Therefore, information related to buying and selling tagging and tracking equipment, legal procedures, and different recipes can be viewed through the present invention. Additionally, the premium account also allows the user to maintain the social media platform through the present invention such that the person using the premium account has the ability to interact with other users who have similar interests.

Although the invention has been explained in relation to its preferred embodiment, it is to be understood that many other possible modifications and variations can be made without departing from the spirit and scope of the invention as hereinafter claimed.

The invention claimed is:

1. A method of tagging and tracking wildlife, comprising:
   storing a plurality of user accounts and a plurality of species profiles;
   prompting a user at a mobile device to enter information associated with a tag of a plurality of tracking tags, wherein the tag is engaged with a wildlife animal;
   receiving the tag information with the mobile device to retrieve a relevant profile from the plurality of species profiles;
   displaying the relevant profile;
   prompting the user to input a plurality of fields;
   receiving catch data for the relevant profile;
   receiving an updated list of geographical information for the relevant profile.

2. A mobile device comprising:
   a memory; and
   a processor configured to control the mobile device for:
   providing a plurality of user accounts and a plurality of species profiles;
   providing a plurality of tracking tags;
   prompting a user at a mobile device to enter information associated with a tag of a plurality of tracking tags engaged with a wildlife animal;
   receiving the tag information with the mobile device to retrieve a relevant profile from the plurality of species profiles;
   displaying the relevant profile;
   prompting the user to input a plurality of fields;
   receiving catch data for the relevant profile;
   receiving an updated list of geographical information for the relevant profile.

* * * * *